(12) United States Patent
He et al.

(10) Patent No.: US 10,748,430 B2
(45) Date of Patent: Aug. 18, 2020

(54) SYSTEMS AND METHODS FOR SELECTIVE TERRAIN DEEMPHASIS

(71) Applicant: HONEYWELL INTERNATIONAL INC., Morris Plains, NJ (US)

(72) Inventors: Gang He, Morristown, NJ (US); Rui Wang, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 200 days.

(21) Appl. No.: 16/042,555

(22) Filed: Jul. 23, 2018

(65) Prior Publication Data

US 2020/0027356 A1   Jan. 23, 2020

(51) Int. Cl.
   *G08G 5/00* (2006.01)
   *B64D 43/00* (2006.01)

(52) U.S. Cl.
   CPC ........... *G08G 5/0021* (2013.01); *B64D 43/00* (2013.01); *G08G 5/0047* (2013.01); *G08G 5/0078* (2013.01); *G08G 5/0086* (2013.01)

(58) Field of Classification Search
   CPC .. G08G 5/0021; G08G 5/0047; G08G 5/0078; G08G 5/0086; B64D 43/00
   See application file for complete search history.

(56) References Cited

U.S. PATENT DOCUMENTS

| | | | |
|---|---|---|---|
| 5,949,918 A * | 9/1999 | McCaffrey | G06T 5/009 382/274 |
| 7,908,082 B2 | 3/2011 | Clark | |
| 8,903,655 B2 | 12/2014 | Feyereisen | |
| 9,355,567 B2 | 5/2016 | Krishna et al. | |
| 10,121,104 B1 * | 11/2018 | Hu | G06N 3/084 |
| 10,338,761 B1 * | 7/2019 | Khan | G06F 3/048 |

(Continued)

FOREIGN PATENT DOCUMENTS

| | | |
|---|---|---|
| EP | 1775556 A1 | 4/2007 |
| WO | 2016195816 A2 | 12/2016 |

OTHER PUBLICATIONS

ICAO, "Guidelines for Electronic Terrain, Obstacle and Aerodrome Mapping Information," Doc 9881, Oct. 16, 2012.

(Continued)

*Primary Examiner* — Calvin Cheung
(74) *Attorney, Agent, or Firm* — Lorenz & Kopf, LLP

(57) ABSTRACT

Improved flight display systems and methods that selectively deemphasize terrain are provided. The method includes receiving and processing navigation reference point data, terrain data, and aircraft status data. Next, the method (a) renders on a display system, in real-time, a viewing segment defined as at least a navigation reference point for the aircraft, the viewing segment having terrain rendered in a first level of terrain contrast; and (b) determines that the aircraft is in a terrain deemphasis scenario when an altitude is certain low altitude operations. When the aircraft is in the terrain deemphasis scenario, the method deemphasizes terrain within a determined boundary in the viewing segment. Deemphasizing includes decreasing terrain contrast to a second level of terrain contrast within the boundary. Terrain contrast within the boundary is restored to the first level responsive to receiving a restore trigger.

20 Claims, 4 Drawing Sheets

(56) References Cited

U.S. PATENT DOCUMENTS

| | | | |
|---|---|---|---|
| 2004/0059473 A1* | 3/2004 | He | B64D 45/04 |
| | | | 701/4 |
| 2004/0093131 A1 | 5/2004 | Block et al. | |
| 2005/0190079 A1 | 9/2005 | He | |
| 2010/0097241 A1* | 4/2010 | Suddreth | G01C 23/00 |
| | | | 340/972 |
| 2011/0095913 A1 | 4/2011 | Painter et al. | |
| 2012/0093402 A1* | 4/2012 | Staelin | G06K 9/4671 |
| | | | 382/165 |
| 2014/0240313 A1* | 8/2014 | Varga | G06T 19/006 |
| | | | 345/419 |
| 2016/0180580 A1* | 6/2016 | Lynch | G01C 21/3638 |
| | | | 345/419 |
| 2016/0200451 A1* | 7/2016 | Wang | G08G 5/025 |
| | | | 701/16 |
| 2018/0178926 A1* | 6/2018 | Louviot | B64D 45/00 |

OTHER PUBLICATIONS

Clark, Sam and George Trampus, "Improving Runway Safety with Flight Deck Enhancements," www.boeing.com/commercial/aeromagazine, Jan. 2011.

Boeing, "Introduction to Jeppesen Navigation Charts," Nov. 23, 2012.

FAA Air Traffic Organization, "National Runway Safety Plan 2009-2011," Jul. 2008.

"Using Chart Annotations in Your Favorite Aviation App," Sporty's iPAD Pilot News, Oct. 9, 2017.

* cited by examiner

SYSTEMS AND METHODS FOR SELECTIVE TERRAIN DEEMPHASIS

TECHNICAL FIELD

The technical field generally relates to aircraft display systems, and more particularly relates to flight display systems and related operating methods for selecting and implementing terrain deemphasis scenarios.

BACKGROUND

Flight display systems often provide multi-functional display features for use in all phases of flight operations. The displayed features may include FMS flight plans, graphic flight planning, traffic, airport moving maps, terrain, geographic boundaries, airspaces, weather radar and uplink weather information, as is relevant for the operations. However, with the many features being displayed simultaneously, the screen may become crowded and more difficult to use. In particular, contrasting used to display terrain data and features can be very dense and may occlude runway and airport features.

For example, for rotorcraft operating in air taxi mode within an airport environment, accentuated terrain feature displays may interfere with airport moving map display features required for taxi operations. Similarly, for fixed wing aircraft operations during landing roll out and preparation for take-off phases, pilots primary needs are to visualize airport environment while maintaining awareness of surrounding terrain features. This makes it desirable to display terrain data and obstacle features differently in an immediate airport environment, compared to the way that terrain data and features are displayed beyond immediate airport taxi areas.

Accordingly, improved systems and methods for selecting and implementing terrain deemphasis scenarios, are desired. The desirable systems and methods provide an adaptive approach by changing the contrast of displayed geographic features based on location or mode operations. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an embodiment, a flight display system for an aircraft is provided. The flight display system includes: a source of navigation reference point data; a source of terrain data; a source of aircraft status data; a display system operationally coupled to the source of navigation reference point data, the source of terrain data, and the source of aircraft status data, the display system rendering thereon, in real-time, a viewing segment including at least a navigation reference point and terrain data, the viewing segment having terrain rendered in a first level of terrain contrast; and a computer system operationally coupled to the display system, the source of terrain data, the source of navigation reference point data, and the source of aircraft status data, the computer system configured to process the terrain data, the navigation reference point data, and the aircraft status data, to: determine that the aircraft is in a terrain deemphasis scenario; and when the aircraft is in the terrain deemphasis scenario, (a) determine a boundary having an area less than an area of the viewing segment; and (b) deemphasize terrain within the boundary by (i) decreasing terrain contrast to a second level of terrain contrast within the boundary and (ii) keeping the first level of terrain contrast external to the boundary; and when terrain is deemphasized, return terrain contrast within the boundary to the first level of terrain contrast responsive to receiving a restore trigger.

Also provided is a flight display method for an aircraft, including: receiving, at a computer system, navigation reference point data, terrain data, and aircraft status data; processing the navigation reference point data, terrain data, and aircraft status data to: (a) render on a display system, in real-time, a viewing segment including navigation reference point data and terrain data, the terrain rendered in a first level of terrain contrast; and (b) determine that the aircraft is in a terrain deemphasis scenario when the aircraft is flying in an identified low altitude operation; and when the aircraft is in the terrain deemphasis scenario, (c) determining a boundary having an area less than an area of the viewing segment; and (d) deemphasizing terrain within the boundary by (i) decreasing terrain contrast to a second level of terrain contrast within the boundary and (ii) keeping the first level of terrain contrast external to the boundary; and when terrain is deemphasized, returning terrain contrast within the boundary to the first level of terrain contrast responsive to receiving a restore trigger.

Another flight display system is provided. The flight display system includes: a processor having an associated storage device and configured to implement a terrain deemphasis program; the processor configured to receive input from a source of navigation reference point data, a source of terrain data, and a source of aircraft status data; the processor configured to process the terrain data, the navigation reference point data, and the aircraft status data, to determine a flight path and generate display commands; a display system configured to receive the display commands from the processor, and responsive thereto, to render a viewing segment defined as at least a portion of a flight path for an aircraft, the viewing segment including terrain rendered in a first level of terrain contrast; and the processor further configured to: determine, by comparing an aircraft altitude to low altitude thresholds, that the aircraft is in a terrain deemphasis scenario; and when the aircraft is in the terrain deemphasis scenario, (a) determine a boundary having an area less than an area of the viewing segment; and (b) deemphasize terrain within the boundary by (i) decreasing terrain contrast to a second level of terrain contrast within the boundary and (ii) keeping the first level of terrain contrast external to the boundary; and when terrain is deemphasized, return terrain contrast within the boundary to the first level of terrain contrast responsive to receiving a restore trigger.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

Exemplary embodiments of the novel disclosed display system with selective terrain deemphasis (FIG. 1, 102) provide technologically improved flight display systems with adaptive terrain deemphasis. The figures and descriptions below provide more detail.

Figure 1:
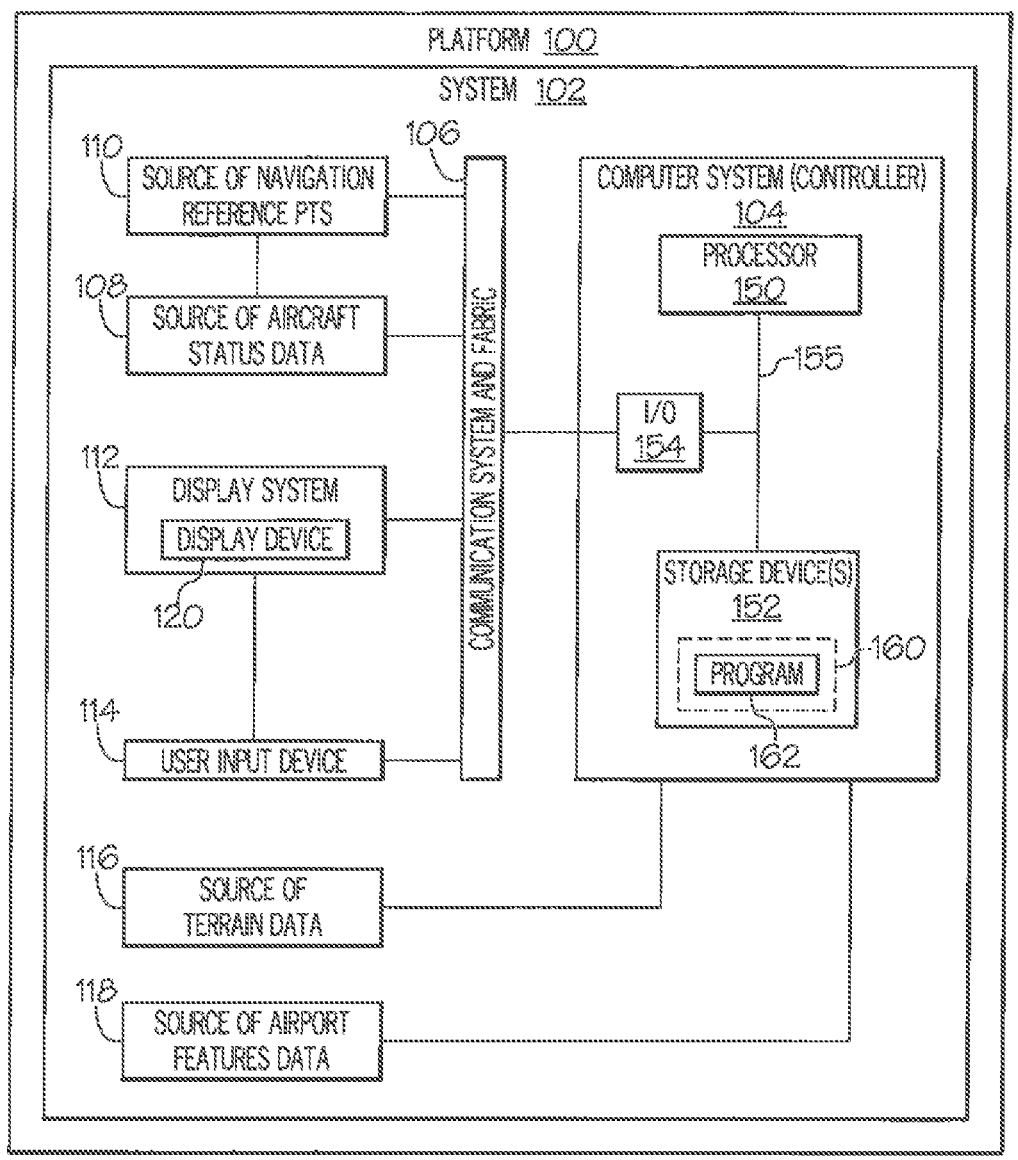
FIG. 1 is a block diagram of a flight display system for evaluation of runway changes, in accordance with an exemplary embodiment.

Turning now to FIG. 1, in an embodiment, the flight display system with selective terrain deemphasis 102 (also referred to herein as "flight display system" 102) is generally located in a mobile platform 100. In various embodiments, the mobile platform 100 is an aircraft, and is referred to as aircraft 100. In some embodiments, the aircraft 100 is a fixed wing aircraft, and in other embodiments, the aircraft 100 is a rotorcraft. In various embodiments, the flight display system 102 comprises a controller or computer system 104 operatively coupled to any combination of the following aircraft systems: a communication system and fabric 106, a source of aircraft status data 108, a source of navigation reference point data 110, a display system 112, a user input device 114, a source of terrain data 116, and a source of airport features data 118. In operation, the computer system 104 may be programmed with program code 162 to perform the flight display system 102 functions described herein. The functions of these aircraft systems, and their interaction, are described in more detail below.

Although depicted as an independent functional block, in some embodiments, the computer system 104 may be integrated within a preexisting mobile platform management system, avionics system, cockpit display system (CDS), flight controls system (FCS), or aircraft flight management system, electronic flight bag, or another portable electronic device. In embodiments in which the computer system 104 is integrated within an EFB, the display system 112 and user input device 114 may also be part of the EFB.

The source of aircraft status data 108 is configured to provide real-time aircraft status data (also referred to as navigation data) and information regarding operation of the aircraft 100. As used herein, "real-time" is interchangeable with current and instantaneous. Accordingly, the source of aircraft status data 108 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the source of aircraft status data 108, as will be appreciated in the art.

The source of aircraft status data 108 is also configured to provide real-time flight guidance for aircraft 100. The source of navigation reference point data 110 provides navigation reference point data, which may include any of: a navigation reference point and an assigned flight plan (FP). In various embodiments, processing data from the source of aircraft status data 108 and the source of navigation reference point data 110 enables comparing the instantaneous position and heading of the aircraft 100 with one or more of: a navigation reference point, an assigned flight plan (FP), and a current route (also referred to as a current flight path), for the aircraft 100. It is generally desirable for the current route or current flight path to be coincident with the assigned flight plan. The source of navigation reference point data 110 may be a navigation database (NDB), datalink, pilot input, or other storage location that maintains a database of flight plans. In various embodiments, the source of navigation reference point data 110 may store and maintain instrument procedures (e.g., approach procedures, arrival routes and procedures, takeoff procedures, and the like).

The source of aircraft status data 108 is further configured to cooperate with a source of airport features data 118. The source of airport features data 118 is a storage location or database, providing information regarding airports, taxiways, runways, and/or other potential landing locations (or destinations) for the aircraft 100. Airport features include airport maps, airspace restrictions, and/or other information or attributes associated with a respective airport (e.g., widths and/or weight limits of taxi paths, the type of surface of the runways or taxi path, and the like). The source of aircraft status data 108 may cooperate with the source of airport features data 118 in the maintenance of an association between a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like). In some embodiments, the airport features data is stored and maintained in the NDB, so a source of airport features data may not be called out separately from the source of navigation reference point data 110.

To summarize, the source of aircraft status data 108 provides aircraft status data, which may include, but is not limited to, any of: (i) the instantaneous position and location, vertical speed, and ground speed of the aircraft 100 (e.g., the latitude, longitude, orientation, and flight path angle), (ii) the instantaneous altitude (or height above ground level) for the aircraft 100, (iii) the instantaneous heading of the aircraft 100 (i.e., the direction the aircraft is traveling in relative to some reference), and (iv) the current phase of flight. The real-time aircraft status data is made available to other on-board systems via the communication system and fabric 106, such that the display system 112 and the computer system 104 may further process and/or handle the aircraft status data.

In an embodiment, the source of terrain data may be 116 a storage location or terrain database. Terrain data provides geographic features such as terrain, obstacles, landmarks, runways, taxiways, and the like, by location, orientation, and dimensions. The terrain data may be considered an information layer that is overlaid onto graphical images of an aircraft's current surroundings. A variety of rendering techniques may be employed by the display system 112 to provide contrast and texture to the terrain data. The present computer system 104 selectively alters the contrast of displayed terrain data, as is described in more detail below.

The display system 112 is configured to continuously receive real-time aircraft status data and navigation reference point data for the aircraft 100 and to dynamically update a graphical image, referred to herein as a viewing segment, based on continuously obtaining the current aircraft status data. The viewing segment includes a portion of a flight path for an aircraft, including at least a navigation reference point, and may include other portions of a current route on which the aircraft 100 is traveling, and/or the assigned flight plan. The display system 112 may further overlay the viewing segment with one or more information layers of real-time terrain data, meteorological conditions data, airspace data, air traffic data, and navigational reference points. When the aircraft 100 is in the air, the displayed current route may be part of a landing procedure, and when the aircraft 100 is on the ground, the displayed current route may be a taxi route.

The display system 112 includes a display device 120. In various embodiments, the display device 120 is an aircraft flight display located within a cockpit of the aircraft 100. The display device 120 may be implemented using any one of numerous known display devices suitable for rendering textual, graphic, and/or iconic information in a format viewable by the pilot or other flight crew member. Non-limiting examples of such display devices include various cathode ray tube (CRT) displays, and various flat panel displays such as various types of LCD (liquid crystal display) and TFT (Thin Film Transistor) displays. In stand-alone implementations, the display device 120 can be realized as a laptop screen, a tablet computer touchscreen, or a mobile device screen. The display device 120 may additionally be implemented as a panel mounted display, a HUD (Head-Up Display) Projection, or any one of numerous known technologies. It is additionally noted that the display device 120 may be configured as any one of numerous types of aircraft flight deck displays. For example, it may be configured as a multi-function display, a horizontal situation indicator, or a vertical situation indicator. Regardless of how the display device 120 is implemented, responsive to display commands, it is used to render any type of two-dimensional and/or three-dimensional image including, but not limited to, alphanumeric, graphics, and iconic information described herein. In some embodiments, the display device 120 includes multiple display screens.

Renderings on the display system 112 may be processed by a graphics system, components of which may be integrated into the display system 112 and/or be integrated within the computer system 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting and contrasting techniques for visually distinguishing objects and routes from among other similar objects and routes.

The computer system 104 is said to display various images and selectable options described herein. In practice, this may mean that the computer system 104 first generates display commands, and second, responsive to receiving the display commands from the computer system 104, the display system 112 displays, renders, or otherwise visually conveys on the display device 120, the graphical images associated with operation of the aircraft 100, and specifically, the various graphical user interface elements, viewing segments, tables, menus, and buttons, as described herein.

Coupled as described herein, the source of aircraft status data 108, source of navigation reference point data 110 and the display system 112 are configured to support navigation, flight planning, and other aircraft control functions in a conventional manner, as well as to provide real-time data and/or information regarding the operational status of the aircraft 100 to the computer system 104. Additionally, in some embodiments, aspects of the user input device 114, source of aircraft status data 108, and display system 112 are configured as a control display unit (CDU).

The user input device 114 and the computer system 104 are cooperatively configured to allow a user (e.g., a pilot, co-pilot, or crew member) to interact with display devices in the display system 112 and/or other elements of the flight display system 102, as described in greater detail below. Depending on the embodiment, the user input device 114 may be realized as a keypad, touchpad, keyboard, mouse, touch panel (or touchscreen), joystick, knob, line select key or another suitable device adapted to receive input from a user. When the user input device 114 is configured as a touchpad or touchscreen, it may be integrated with the display system 112. As used herein, the user input device 114 may be used to for a pilot to accept a runway change or to request a runway change.

The communication system and fabric 106 is configured to support instantaneous (i.e., real time or current) communications between the aircraft 100 systems and components. As a functional block, the communication system and fabric 106 may represent one or more transmitters, receivers, a communications bus, and the supporting communications hardware and software required for the flight display system 102 operations as described herein.

In FIG. 1, an embodiment of the controller or computer system 104 includes a processor 150 and storage devices(s) 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The storage device(s) 152 may comprise any combination of memory and persistent storage. Accordingly, the storage device(s) may include RAM memory, ROM memory, flash memory, registers, a hard disk, or another suitable non-transitory short or long-term storage media capable of storing computer-executable programming instructions or other data for execution.

Generally, the storage device(s) 152 maintain data bits and may be utilized by the processor 150 as storage and/or a scratch pad during operation. Specifically, the storage device(s) 152 stores instructions and applications, and specifically, program 162 and its corresponding stored variables. The storage device(s) 152 may be located on and/or co-located on the same computer chip as the processor 150, and/or may be removable. Information in the storage device(s) 152 may be organized and/or imported from an external data source during an initialization step of a process; it may also be programmed via a user input device 114.

The novel terrain deemphasis program 162 includes rules and instructions which, when executed, cause the computer system 104 to perform the functions, techniques, and processing tasks associated with the operation of the flight display system 102. Novel program 162 includes, inter alia, a module for phase of flight and/or customized flight level determination, a module for comparing object sizes to customized dimension thresholds, a customized terrain deemphasizing module, and associated stored variables. The novel program 162 may be stored in a functional form, in the context of a fully functioning computer system, such as in the depicted exemplary embodiment of computer system 104. Those skilled in the art will recognize that the novel program 162 may also take the form of a program product 160, stored and distributed using one or more types of non-transitory computer-readable media. In this form, program product 160, including the program 162, stores the computer instructions for causing a computer processor (such as the processor 150) to perform and execute the program 162. Examples of computer-readable media include: recordable media such as floppy disks, hard drives, memory cards and optical disks, and signal or transmission media such as digital and analog communication links. It will be appreciated that cloud-based storage and/or other techniques may also be utilized in certain embodiments.

In executing the process described herein, the processor 150 specifically loads the instructions embodied in the program 162, thereby being programmed with program 162. During execution of program 162, the processor 150 and the storage device(s) 152 form a novel terrain deemphasis processing engine that performs the modular processing activities of the flight display system 102.

In various embodiments, the processor/storage devices of the computer system 104 may be communicatively coupled (via a bus 155) to an input/output (I/O) interface 154. The bus 155 serves to transmit programs, data, status and other information or signals between the various components of the computer system 104. The bus 155 can be any suitable physical or logical means of connecting computer systems and components. This includes, but is not limited to, direct hard-wired connections, fiber optics, infrared and wireless bus technologies.

The I/O interface 154 enables intra computer system 104 communication, as well as communications between the computer system 104 and other flight display system 102 components. The I/O interface 154 may include one or more network interfaces and can be implemented using any suitable method and apparatus. In various embodiments, the I/O interface 154 is configured to support communication from an external system driver and/or another computer system. Also, in various embodiments, the I/O interface 154 may support communication with technicians, a network card, and/or one or more storage interfaces for direct connection to storage apparatuses, such as the database 156. In one embodiment, the I/O interface 154 is integrated with the communication system and fabric 106, and obtains data from various flight display system 102 source(s) directly.

Although shown embodied as a programmed computer system, the computer system 104 is a controller, and in various embodiments, the computer system 104 may comprise other means for facilitating communications and/or interaction between the elements of the flight display system 102 and performing the processes, tasks and/or functions to support operation of the flight display system 102, as described herein. In various embodiments, the computer system 104 may be any hardware, software, firmware, electronic control component, processing logic, and/or processor device, individually or in any combination. Depending on the embodiment, the computer system 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Figure 2:
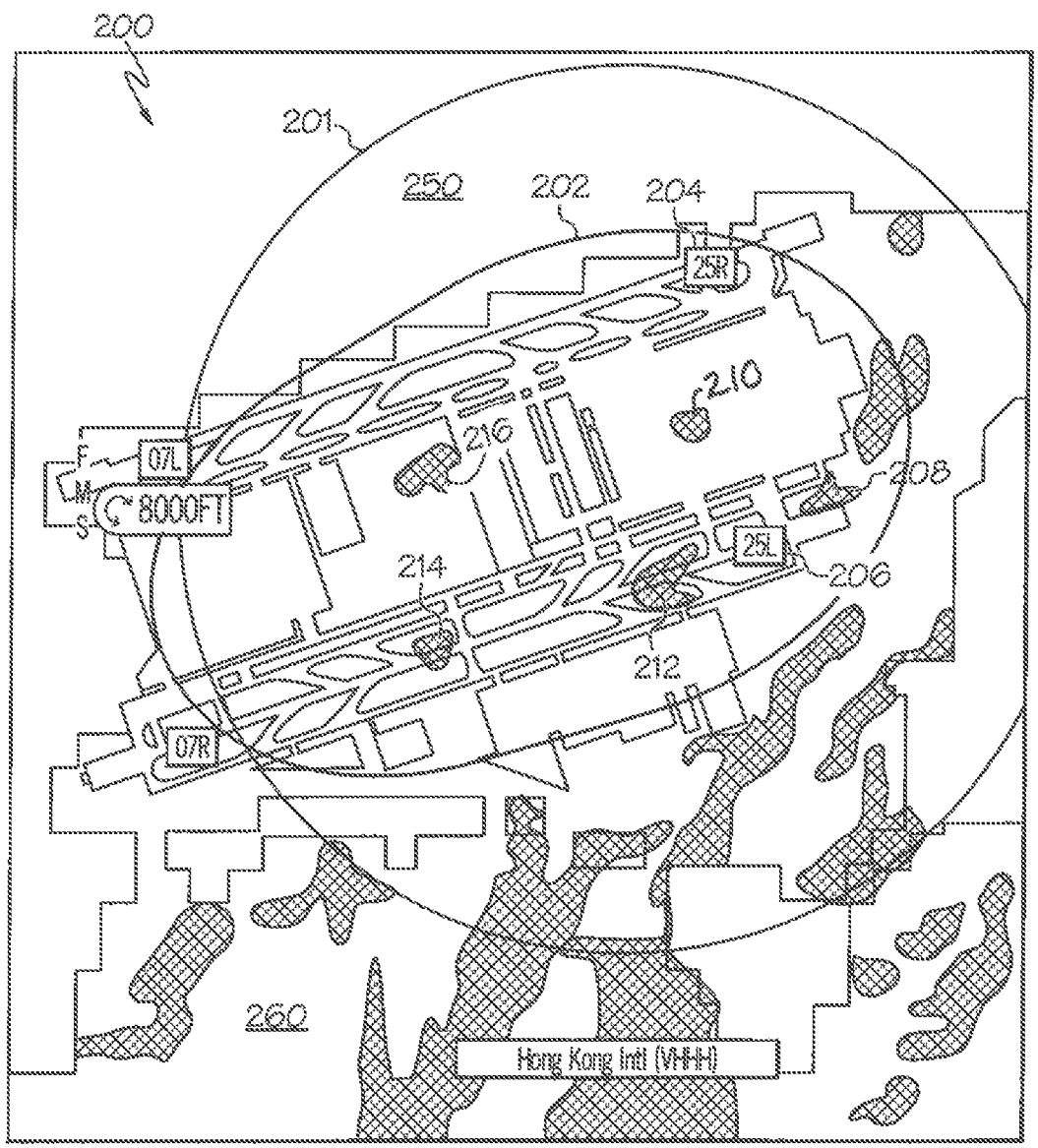
FIG. 2 is a viewing segment of a portion of a flight path showing a first level of terrain contrast, in accordance with an exemplary embodiment.
Figure 3:
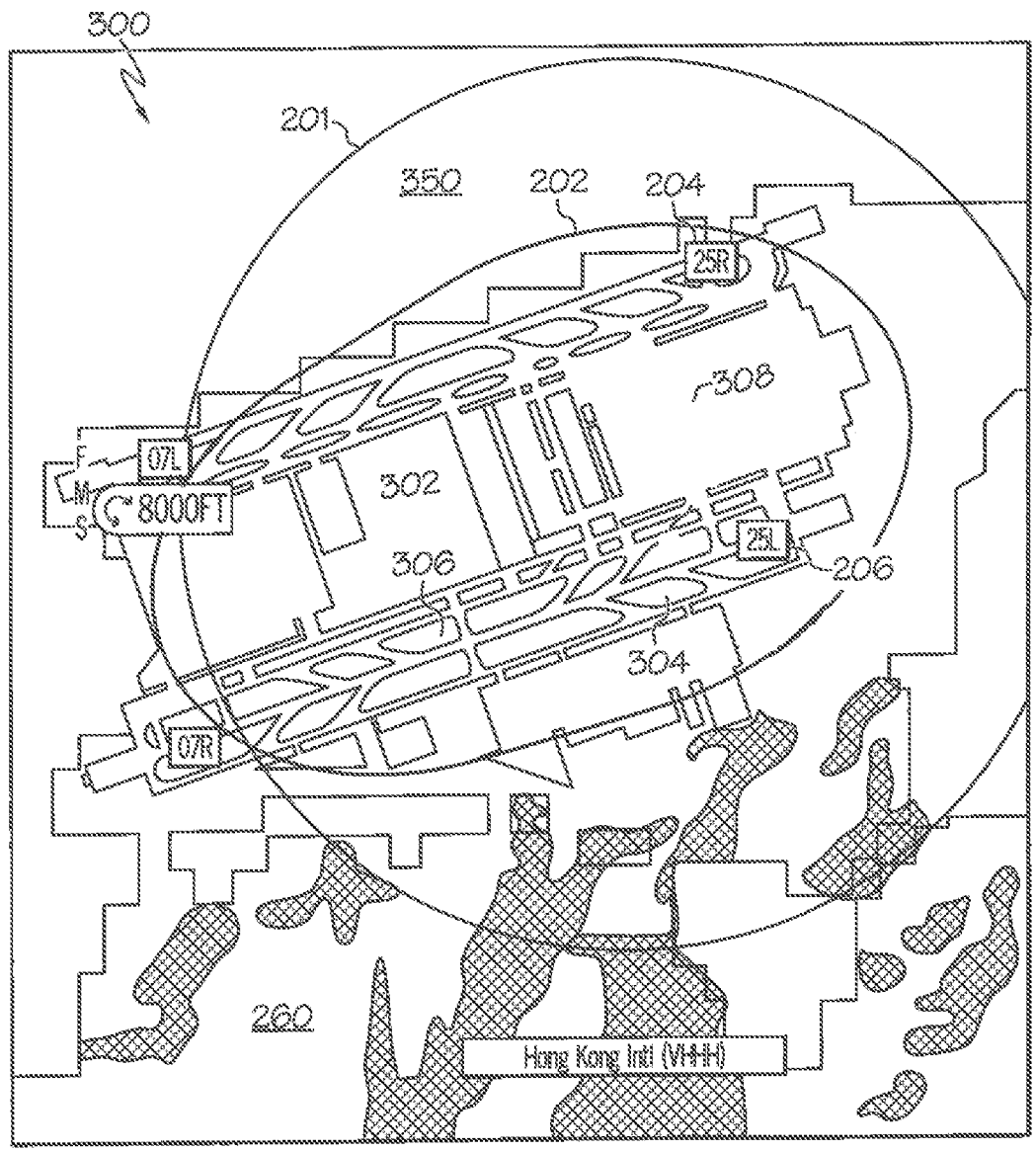
FIG. 3 is the viewing segment of FIG. 2, with terrain deemphasized to a second level of contrast within a predetermined boundary, in accordance with an exemplary embodiment.

As mentioned, the computer system 104 provides a technologically enhanced flight display system 102 with selective terrain deemphasis, selective in accordance with predefined scenarios. The provided terrain deemphasis may decrease cognitive load and increase the speed of decision making and data comprehension in critical flight scenarios. Turning to FIGS. 2-3, the technological enhancement is illustrated.

Image 200 and image 300 are top-down depictions of the same viewing segment of an airport. The terrain data provides terrain and topography information and is rendered using shading to contrast elevation differences (this shading and contrasting is sometimes referred to as providing texture). In color imaging, a combination of colors and shading may very effectively convey not only the texture of underlying terrain, but differences in the terrain itself, such as water and land. A range ring 201 encircles an area 250 having therein runway 204 (labeled 25R) and runway 206 (labeled 25L). An enclosed boundary 202, generated by the system 102, and In image 200, the selective terrain deemphasis system 102 is not active, and in image 300 the selective terrain deemphasis system 102 is active, depicting the technical enhancement provided by the flight display system 102, in accordance with an embodiment. For example, you can see dark patches in the area 250 enclosed by boundary 202. Dark patches are labeled at 208, 210, 212, 214, and 216. In image 300, range ring 201 encloses the area 350, and it is observable that terrain has been deemphasized within the boundary 202. Looking at area 302, 304, 306, and 308, the dark patches shown in FIG. 2 have been removed or are substantially reduced.

When the provided terrain deemphasis is active, features of importance, such as runways, appear more crisply rendered (or appear to be in higher contrast), providing greater noticeable detail. The appearance of being more crisply rendered is a result of a resolution difference created by the disclosed system and method; the resolution difference being between airport feature data contrast and the (deemphasized) terrain contrast. A viewing experience like that provided in area 350 supports a pilot more quickly ascertaining and comprehending relevant airport feature information, thereby reducing cognitive workload. As may be readily appreciated, when the images are rendered in color, the technical enhancement provided is even more dramatic.

The terrain deemphasis scenarios are referred to as "selective" because they are predetermined and configurable. In various embodiments, a user may, selectively, include any combination of low altitude operations, such as taxi, takeoff, and landing for fixed wing aircraft, and air taxi mode for rotorcraft. In some embodiments, the computer system 104 may also support the user also selecting one or more obstacle-based terrain deemphasis scenarios. In these embodiments, the computer system 104 processes terrain data to determine when objects or obstacles are smaller than predetermined dimensions, and trigger a terrain deemphasis scenario when underlying objects or obstacles are small. This terrain deemphasis scenario may be useful when underlying terrain is jagged, but understood.

Figure 4:
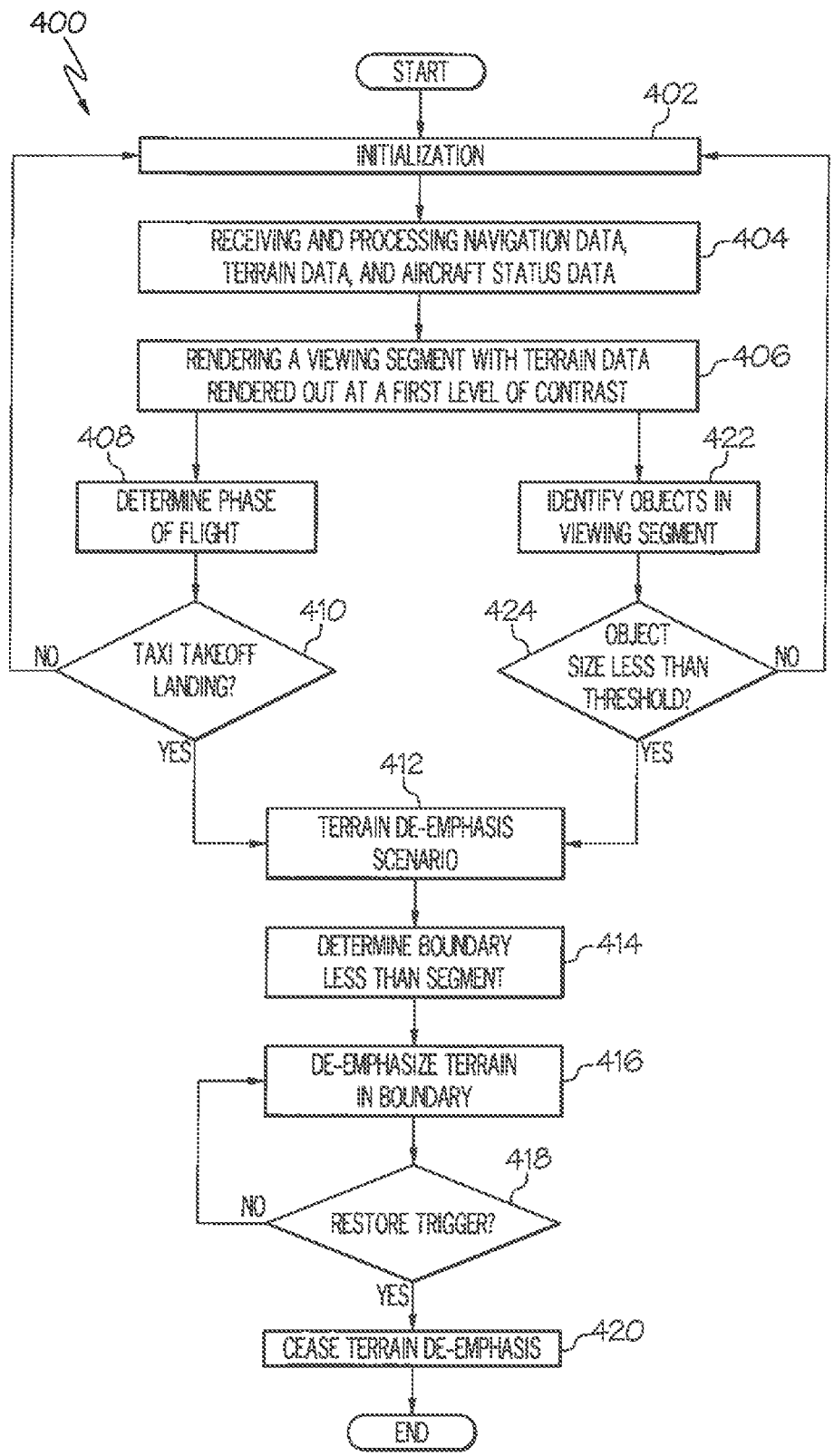
FIG. 4 is a flow chart for a method for evaluation of runway changes, in accordance with an exemplary embodiment.

Referring now to FIG. 4 and with continued reference to FIGS. 1-3, a flow chart is provided for a method 400 for providing a flight display system 102, in accordance with various exemplary embodiments. Method 400 represents various embodiments of a method for terrain deemphasis. For illustrative purposes, the following description of method 400 may refer to elements mentioned above in connection with FIG. 1. In practice, portions of method 400 may be performed by different components of the described system. It should be appreciated that method 400 may include any number of additional or alternative tasks, the tasks shown in FIG. 4 need not be performed in the illustrated order, and method 400 may be incorporated into a more comprehensive procedure or method having additional functionality not described in detail herein. Moreover, one or more of the tasks shown in FIG. 4 could be omitted from an embodiment of the method 400 if the intended overall functionality remains intact.

The method starts, and at 402 the computer system 104 is initialized. Initialization may comprise uploading or updating instructions and applications, program 162, stored variables, and reference data and lookup tables stored in the database 156. Predetermined variables may include, for example, predetermined altitudes, distances, and times to use as thresholds, predetermined dimensions for object size comparisons, parameters for setting up a user interface, and the various shapes, various colors and/or visually distinguishing techniques used for terrain, tables, icons, and alerts. In some embodiments, program 162 includes additional instructions and rules for rendering information differently based on type of display device in display system 112.

At 404, the aircraft 100 is in operation, and the computer system 104 is continually receiving and processing navigation reference point data, terrain data, and aircraft status data. Based thereon, at 406, a viewing segment is rendered on the display device 120. The viewing segment is defined as a displayed area including at least a navigation reference point from the navigation data and terrain information from the terrain data, the viewing segment renders terrain in a first level of terrain contrast. The first level of terrain contrast is an application specific default level of contrast that is used whenever the method is not actively deemphasizing terrain. As mentioned, the display system is operationally coupled to the source of navigation reference point data, the source of terrain data, and the source of aircraft status data; at 404, inputs from these sources are processed by the display system to generate and render the viewing segment on the display device 120.

The method 400 continually processes the received information to monitor for an appropriate low altitude operation for which to activate the terrain deemphasis. In an embodiment, a phase of flight is determined at 408, and if the phase of flight is a low altitude operation such as a taxi, a take-off, or a landing operation (at 410), the method 400 determines that it has identified a terrain deemphasis scenario at 412. In some embodiments, in lieu of steps 408 and 410, altitude is monitored. In the case that altitude is monitored, and phase of flight is not, the aircraft's altitude may be compared to an upper altitude threshold and a lower low altitude threshold, and when the altitude is below the upper altitude threshold (but above the lower altitude threshold) the method 400 determines that it has identified a terrain deemphasis scenario at 412. The lower altitude threshold is a safety band in this scenario; as rotorcraft pilots may especially prefer to have the full terrain contrast when flying very low to the ground.

Responsive to determining that there's a terrain deemphasis scenario at 412, the method determines a boundary 202 at 414 for terrain deemphasis. The boundary 202 is an enclosed area, and is understood to be smaller in area than the viewing segment. The boundary 202 may have a simple geometric shape, or a complex shape. In various embodiments, the boundary 202 may be the airport boundary, or a geometric area surrounding a desired landing area. In a non-limiting example, the method 400 may determine the boundary 202 by any of (i) referencing a predetermined setting, (ii) receiving user input, and (iii) dynamically determining the boundary, for example, as a function of target landing area and altitude or distance. Deemphasizing terrain at 416 includes deemphasizing terrain within the boundary, by (i) decreasing terrain contrast to a second level of terrain contrast within the boundary and (ii) keeping the first level of terrain contrast external to the boundary. As mentioned, contrast levels are application specific, reflecting the capability of the specific display device 120 and the display system 112. Terrain contrast may also include color. Regardless of the terrain contrasting used, the contrast of the terrain is changed from a first level to a second level (of less contrast then the first level) during 416. As mentioned, this step increases the perceived contrast of other features, such as features in the airport features information layer relative to the terrain in the area enclosed by the boundary.

The terrain deemphasis at 416 continues until a restore trigger is received at 418. The restore trigger may be one or more from the set including, (i) a deviation from an assigned flight plan by more than a threshold distance, (ii) a deviation from the assigned flight plan by more than a threshold distance for more than a threshold amount of time, and (iii) a threshold amount of time elapsing. Upon receiving the restore trigger at 418, the method 400 ceases the terrain deemphasis at 420. After 420, the method may end, or may return to 404.

As mentioned, in some embodiments, the method 400 additionally monitors the terrain data to perform an object-based terrain deemphasis scenario. For example, at 422, the method 400 monitors the terrain data making up the area of the viewing segment and identifies objects and or obstacles in the viewing segment. For each identified object, the dimensions are compared to respective dimension thresholds at 424. If the identified object has dimensions less than the respective threshold dimensions, the method determines a terrain deemphasis scenario has occurred at 412. When there is a plurality of identified objects at 422, then at 424, each object of the plurality of objects must be less than respective threshold dimensions for the method 400 to determine that there is a terrain deemphasis scenario at 412. From 412, the flow is the same as the earlier described flow. The object based terrain deemphasis scenario may be useful for the previously described low altitude operations and/or for rotorcraft. In these scenarios, it may be desirable to clearly distinguish features from other map layers, such as airport features, without the distraction of the texture in the viewing segment provided by the default terrain contrast.

Thus, a computer system 104 providing an enhancement to the way visual information is presented by flight display systems is provided. It is an enhancement because potentially distracting shading (representative of terrain information) is reduced in an area of keen focus during low altitude flight operations, such as taxi, takeoff, landing, and rotorcraft air taxi. The image 300 shown in FIG. 3 illustrates this enhancement. As is readily appreciated, the above examples of the methods and systems for selective terrain deemphasis 102 are non-limiting, and many others may be addressed by the computer system 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from the set including A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight display system for an aircraft, comprising:
   a source of navigation reference point data;
   a source of terrain data;
   a source of aircraft status data;
   a display system operationally coupled to the source of navigation reference point data, the source of terrain data, and the source of aircraft status data, the display system rendering thereon, in real-time, a viewing segment including a navigation reference point and terrain data, the viewing segment comprising terrain rendered in a first level of terrain contrast; and
   a computer system operationally coupled to the display system, the source of terrain data, the source of navigation reference point data, and the source of aircraft status data, the computer system configured to process the terrain data, the navigation reference point data, and the aircraft status data, to:
      determine that the aircraft is in a terrain deemphasis scenario; and
      when the aircraft is in the terrain deemphasis scenario,
         (a) determine a boundary having an area less than an area of the viewing segment; and
         (b) deemphasize terrain within the boundary by (i) decreasing terrain contrast to a second level of terrain contrast within the boundary and (ii) keeping the first level of terrain contrast external to the boundary; and when terrain is deemphasized, return terrain contrast within the boundary to the first level of terrain contrast responsive to receiving a restore trigger.

2. The flight display system of claim 1, wherein the terrain deemphasis scenario is one of the set including taxi, take-off, and landing.

3. The flight display system of claim 2, wherein the restore trigger is a threshold amount of time elapsing.

4. The flight display system of claim 3, wherein the boundary is the same as an airport boundary.

5. The flight display system of claim 3, wherein the control module is further configured to determine that the aircraft is in a terrain deemphasis scenario when the aircraft is a rotorcraft and a rotorcraft altitude is below a threshold altitude.

6. The flight display system of claim 5, wherein the restore trigger is a deviation from an assigned flight plan.

7. The flight display system of claim 6, wherein the restore trigger is a deviation from the assigned flight plan by more than a threshold distance for more than a threshold amount of time.

8. The flight display system of claim 7, wherein the control module is further configured to:
monitor the terrain data in the viewing segment to identify a plurality of objects therein;
for each object of the plurality of objects, compare object dimensions to dimension thresholds; and
determine that the aircraft is in a terrain deemphasis scenario when each object of the plurality of objects has dimensions less than respective threshold dimensions.

9. A flight display method for an aircraft, comprising:
receiving, at a computer system, navigation reference point data, terrain data, and aircraft status data;
processing the navigation reference point data, terrain data, and aircraft status data to:
(a) render on a display system, in real-time, a viewing segment comprising navigation reference point data and terrain data, the terrain rendered in a first level of terrain contrast; and
(b) determine that the aircraft is in a terrain deemphasis scenario when the aircraft is flying in an identified low altitude operation; and
when the aircraft is in the terrain deemphasis scenario,
(c) determining a boundary having an area less than an area of the viewing segment; and
(d) deemphasizing terrain within the boundary by (i) decreasing terrain contrast to a second level of terrain contrast within the boundary and (ii) keeping the first level of terrain contrast external to the boundary; and
when terrain is deemphasized,
returning terrain contrast within the boundary to the first level of terrain contrast responsive to receiving a restore trigger.

10. The method of claim 9, wherein the identified low altitude operation is one of taxi, take-off, and landing.

11. The method of claim 10, wherein the restore trigger is a threshold amount of time elapsing.

12. The method of claim 11, wherein the boundary is an enclosed area smaller than an area of the viewing segment and surrounding a desired landing area.

13. The method of claim 12, wherein the control module is further configured to identify a restore trigger as a deviation from an assigned flight plan.

14. The method of claim 13, wherein the restore trigger is a deviation from the assigned flight plan by more than a threshold distance for more than a threshold amount of time.

15. The method of claim 14, further comprising:
monitoring the terrain data in the viewing segment to identify a plurality of objects therein;
for each object of the plurality of objects, comparing object dimensions to respective object dimension thresholds; and
determining that the aircraft is in a terrain deemphasis scenario when each object of the plurality of objects has dimensions less than respective threshold dimensions.

16. A flight display system, comprising:
a processor having an associated storage device and configured to implement a terrain deemphasis program;
the processor configured to receive input from a source of navigation reference point data, a source of terrain data, and a source of aircraft status data;
the processor configured to process the terrain data, the navigation reference point data, and the aircraft status data, to determine a flight path and generate display commands;
a display system configured to receive the display commands from the processor, and responsive thereto, to render a viewing segment including at least a navigation reference point, the viewing segment comprising terrain rendered in a first level of terrain contrast; and
the processor further configured to:
determine, by comparing an aircraft altitude to low altitude thresholds, that the aircraft is in a terrain deemphasis scenario; and
when the aircraft is in the terrain deemphasis scenario,
(a) determine a boundary having an area less than an area of the viewing segment; and
(b) deemphasize terrain within the boundary by (i) decreasing terrain contrast to a second level of terrain contrast within the boundary and (ii) keeping the first level of terrain contrast external to the boundary; and
when terrain is deemphasized, return terrain contrast within the boundary to the first level of terrain contrast responsive to receiving a restore trigger.

17. The flight display system of claim 16, wherein the restore trigger is a threshold amount of time elapsing.

18. The flight display system of claim 17, wherein the restore trigger is a deviation from an assigned flight plan or a deviation from the assigned flight plan by more than a threshold distance for more than a threshold amount of time.

19. The flight display system of claim 18, wherein the boundary is an enclosed area smaller than an area of the viewing segment and surrounding a desired landing area.

20. The flight display system of claim 19, wherein the processor is further configured to
monitor the terrain data in the viewing segment to identify a plurality of objects therein;
for each object of the plurality of objects, compare object dimensions to dimension thresholds; and
further determine that the aircraft is in a terrain deemphasis scenario when each object of the plurality of objects has dimensions less than respective threshold dimensions.

* * * * *